US012715323B2

(12) United States Patent
Ranftl et al.

(10) Patent No.: US 12,715,323 B2
(45) Date of Patent: Aug. 25, 2026

(54) CHARGING SOCKET FOR A VEHICLE HAVING A SIMPLE STRUCTURE

(71) Applicant: Lisa Dräxlmaier GmbH, Vilsbiburg (DE)

(72) Inventors: Oliver Ranftl, Mauerkirchen (AT); Markus Kreuzhuber, Ried (AT)

(73) Assignee: LISA DRAXLMAIER GMBH, Vilsbiburg (DE)

( * ) Notice: Subject to any disclaimer, the term of this patent is extended or adjusted under 35 U.S.C. 154(b) by 317 days.

(21) Appl. No.: 18/403,789

(22) Filed: Jan. 4, 2024

(65) Prior Publication Data

US 2024/0217354 A1 Jul. 4, 2024

(30) Foreign Application Priority Data

Jan. 4, 2023 (DE) ..................... 10 2023 100 130.2

(51) Int. Cl.
*B60L 53/16* (2019.01)
*B60R 16/02* (2006.01)
*H01R 13/52* (2006.01)

(52) U.S. Cl.
CPC .......... *B60L 53/16* (2019.02); *B60R 16/0207* (2013.01); *H01R 13/5202* (2013.01); *H01R 2201/26* (2013.01)

(58) Field of Classification Search
CPC . B60L 53/16; H01R 13/6683; H01R 13/6616; H01R 13/5202
USPC ......................................... 439/589, 301, 310
See application file for complete search history.

(56) References Cited

U.S. PATENT DOCUMENTS 11,336,051 B1 * 5/2022 Tyler .................. H01R 13/5202
12,151,571 B2 * 11/2024 Weyrauch ............... B60L 53/16
2022/0396162 A1 * 12/2022 Weyrauch ............... B60L 53/16
(Continued)

FOREIGN PATENT DOCUMENTS

DE 112018003970 T5 4/2020
DE 102021123847 A1 3/2022
FR 3050078 A1 * 10/2017 ........... H01R 13/641

OTHER PUBLICATIONS

Machine English language translation of DE102021123847A1.
(Continued)

*Primary Examiner* — Hae Moon Hyeon
(74) *Attorney, Agent, or Firm* — BelayIP

(57) ABSTRACT

A charging socket for a vehicle is disclosed. The charging socket includes two L-shaped intermediate brackets which each electrically conductingly connect a contact element of the charging socket to an interface of the charging socket to a conductor of a cable harness of the vehicle. The contact is arranged at a country-specific or variant-specific spacing to one another on front limbs of the intermediate brackets and the interfaces are arranged on rear limbs of the intermediate brackets. The rear limbs are oriented transversely with respect to the front limbs. The intermediate brackets are electrically insulated from one another. The front limbs with the contact elements are arranged within a housing of the charging socket transversely with respect to a plug-in direction of the contact elements and the rear limbs with the interfaces being arranged in domes of the housing that project from a rear side of the housing.

20 Claims, 1 Drawing Sheet

(56) References Cited

U.S. PATENT DOCUMENTS

2024/0351457 A1* 10/2024 Venkatesan ............ H01R 13/04

OTHER PUBLICATIONS

Machine English language translation of DE112018003970T5.
German Examination Report for Application DE102023100130.2 (in German).
Machine English language translation of German Examination Report for Application DE102023100130.2 (in German).

* cited by examiner 100,102
104
106
116
120
124
118
130
134
130
114
128
122
108
110
140
112
132
136
138
126
150
152

CHARGING SOCKET FOR A VEHICLE HAVING A SIMPLE STRUCTURE

CROSS REFERENCE TO RELATED APPLICATIONS

This application claims priority to German Patent Application number 102023100130.2, filed Jan. 4, 2023, the content of which is herein incorporated by reference.

BACKGROUND OF THE INVENTION

Field of the Invention

The present invention relates to a charging socket for a vehicle.

The present invention is described below primarily in connection with on-board electrical systems for electric vehicles.

Description of Related Art

An electrically powered vehicle can be charged via a charging socket. To this end, a charging cable of a charging device or of a charging station with a charging plug is plugged into the charging socket and a charging operation is commenced.

A plug geometry of the charging socket can be standardized by a country-specific charging standard in order for the vehicle to be able to be charged at all charging devices or charging stations in the country. Aside from the standardized geometry, a design of the charging socket is different individually for different manufacturers of electrically powered vehicles.

There is therefore a large variety of variants of charging sockets, although they all have the same intended use.

BRIEF SUMMARY OF THE INVENTION

It is therefore an object of the invention to provide an improved charging socket using the structurally simplest means. Here, an improvement may for example relate to a reduction in the variety of variants.

The object is achieved by the subject matter of the independent claim. Advantageous developments of the invention are specified in the dependent claims, the description and the accompanying figures.

A charging socket has standardized contact elements. The type and position of the contact elements differ from world region to world region. In particular, the two contact elements of a direct current part of the charging socket have different axial spacings depending on the world region. Equally, the contact elements are for example male in some world regions, and female in other world regions. In order to be able to install charging sockets at different positions on the vehicle in different vehicles, a plurality of different variants of the charging socket exist for each world region.

By way of example, the variants may have different outgoing directions of conductors of a cable harness of the vehicle. Equally, the variants may be configured for different types of conductors, for example flat conductors or busbars, or round conductors or cables.

In the approach presented here, a uniform interface to the cable harness is used. Required variants are formed by differently shaped cable harnesses. Both flat conductors and cable lugs of round conductors can be fastened to the interface.

Here, the standardized interface is connected to the contact elements via two intermediate pieces. The intermediate pieces are in this case angled and are referred to as intermediate brackets. Due to the angled shape, the intermediate pieces each have a front surface on which a respective one of the contact elements of the required country-specific type can be readily arranged at the required country-specific position. The angled shape furthermore permits a respective rear region per intermediate piece, said rear region being oriented substantially parallel to the respective contact element. The rear regions form the interface to the cable harness. From this region, conductors can be led away in all directions. In this case, each intermediate piece can be used for connection of one conductor of the cable harness.

The approach presented here can considerably reduce a variety of variants in charging sockets, which can result in reduced tool costs. Different variants of the cable harnesses can be produced with significantly less effort than variants of the charging socket. In addition, a substantially uniform interior can be used for charging sockets for different world regions and merely country-specific contact elements are arranged in country-specific plug geometries at the country-specific positions on the intermediate pieces.

A charging socket for a vehicle is proposed, the charging socket having two L-shaped intermediate brackets which each electrically conductingly connect a contact element of a direct current part of the charging socket to an interface of the charging socket to a conductor of a cable harness of the vehicle, the contact elements being arranged at a country-specific or variant-specific spacing to one another on front limbs of the intermediate brackets and the interfaces being arranged on rear limbs of the intermediate brackets, said rear limbs being oriented transversely with respect to the front limbs, the intermediate brackets being electrically insulated from one another, the front limbs with the contact elements being arranged within a housing of the charging socket transversely with respect to a plug-in direction of the contact elements and the rear limbs with the interfaces being arranged in domes of the housing that project from a rear side of the housing.

Depending on the charging standard of a specific country, a charging socket can have contact elements embodied as pins or sleeves. Depending on the charging standard, the contact elements can be at different distances apart from one another. The contact elements can be arranged parallel to one another in a plug-in direction of the contact elements. The contact elements can be arranged in a plug geometry of the charging socket so as to be touch-protected. The plug geometry can also be defined by the charging standard.

The charging socket can also have an interface to a cable harness. Conductors of the cable harness can be electrically conductingly connected to the contact elements via the interface. The interface can be of standardized embodiment for different variants of the charging socket.

An intermediate bracket can be arranged between a contact element and an interface to one of the conductors. The intermediate bracket is electrically conducting and composed of a metal material. The metal material can, for example, be a copper material or an aluminium material. The intermediate bracket can have an angled shape. The intermediate bracket can consequently have two limbs. A first limb of the intermediate bracket, referred to as front limb, can be electrically conductingly connected to the contact element and be oriented substantially perpendicularly with respect to the plug-in direction of the contact element. A second limb of the intermediate bracket, referred to as rear limb, can have the interface and be oriented substantially parallel to the plug-in direction.

The interface can be designed to be connected to a cable lug of the conductor or directly to the conductor in the form of a busbar.

The charging socket can have a housing composed of a plastics material. The housing is able to perform electrical insulation. The housing can have at least two domes for the rear limbs on its rear side. A dome can be a substantially cylindrical extension of the housing. The domes can be aligned substantially with the plug-in direction.

The domes can each have a rear opening. The interface inside a dome can be reached through the opening. The domes can have sealed closure caps. The closure caps can each have a leadthrough for the conductor of the cable harness through a cover surface of the closure cap. At least one respective contacting seal can be arranged between the closure caps and the domes. The closure caps can be pushed onto the conductors of the cable harness. The conductors can then be connected to the intermediate brackets at the interfaces in the domes and the closure caps can be pushed onto the domes in order to close the domes. Due to the closure caps, the interfaces can be protected against external influences. Seals can be composed of an elastic material, such as a rubber material or an elastomer material. When the closure caps are being pushed on, the seals can be slightly elastically deformed and thus provide sealing between the closure caps and the domes. The seals can, for example, be O-rings. The seals and the housing or the closure caps may alternatively also be embodied as a two-component injection molding composed of a soft component for the seals and a hard component for the housing or the closure cap.

The closure caps 126 can have at least one respective latching device 150 for latching to counterparts 152 of the housing 120. The closure caps 126 or the housing 120 can, for example, have latching lugs 150, behind which tabs 152 of the housing 120 or of the closure caps 126 engage with latching action when the closure caps 126 are pushed onto the domes 124. The latching devices can ensure a secure mechanical connection between the closure caps and the housing.

The leadthroughs can each have a collar for supporting the conductor. The seals can be designed to transmit supported forces to the domes. A collar can be a periphery, running along the conductor, around the leadthrough. The collar can also be referred to as flange. The collar can provide an abutment surface for the conductor. Due to the abutment surface, a local load peak on the conductor can be avoided. The collars can also offer protection against contaminants and penetrating moisture. On account of their elasticity, the seals can compensate for movements and continue to provide sealing in spite of slight relative movements between the conductor and the charging socket.

The closure caps can be designed to be pushed onto the conductors before the conductors are connected to the intermediate brackets via the interfaces. In this case, the closure caps can be pushed onto the conductors until the interfaces in the domes are able to be reached. After the conductors have been fastened to the interfaces, the closure caps can be pushed over the domes and provide sealing by way of the seal at the domes.

The rear limbs can each have, at the interfaces, a threaded bushing for screw connection of the conductor. The threaded bushing can, for example, be integrally welded onto the rear limbs. In this case, the threaded bushing may, for example, be integrally welded on by friction welding. A threaded bushing makes it possible to provide a durable thread. The threaded bushing can consist of a harder material than the intermediate bracket.

The domes can each have a lateral service opening aligned with the threaded bushings. A tool for screw connection of the interface can be introduced through the service opening. Equally, a screw for screw connection of the interface can be introduced through the service opening. The service openings can be sealed by a separate service cover. Equally, the service openings can be sealed by the pushing on of the closure caps.

The closure caps can also have service openings which are aligned with the threaded bushings in an end position of the closure caps. At least the service openings in the closure caps may be able to be closed by service covers. The service openings in the domes and in the closure caps can be approximately concentric. The service covers can close only the service openings in the closure caps or also simultaneously the service openings in the domes. If a service cover closes the service openings on the closure cap and the dome, the service cover may mechanically connect the closure cap and the dome to one another and make it impossible to pull off the closure cap.

The service covers can each have a sealing element for sealing the service opening. A sealing element can consist of an elastic material and be slightly elastically deformed when the service opening is being closed. The sealing element can, for example, be placed onto the service cover prior to the closing of the service opening. Alternatively, the service cover and the sealing element may be embodied as a two-component injection molding composed of a soft component for the sealing element and a hard component for the service cover. The sealing element can provide sealing at both mutually aligned service openings.

The domes can each have a seal. The seal can span at least an inner diameter of the respective dome and have an oversize in relation to the inner diameter. In an installed state, the seal can provide sealing on an inner side of the dome. The seal can be arranged under the closure cap. The seal can be pressed against an edge of the dome by the closure cap in order to provide sealing at the edge. The seal can be inserted into the closure cap prior to the pushing onto the dome.

The seal can also have a leadthrough for the conductor of the cable harness. The leadthrough can have an undersize in relation to the conductor. In the installed state on the cable, the leadthrough can provide sealing. The seal can be compressed during installation. Due to the compression, the seal can be pressed against a surface of the conductor in the region of the leadthrough and provide sealing at the conductor.

BRIEF DESCRIPTION OF THE SEVERAL VIEWS OF THE DRAWINGS

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure. An advantageous embodiment of the present invention is set out below with reference to the accompanying figures, wherein.

Figures 1, 2:
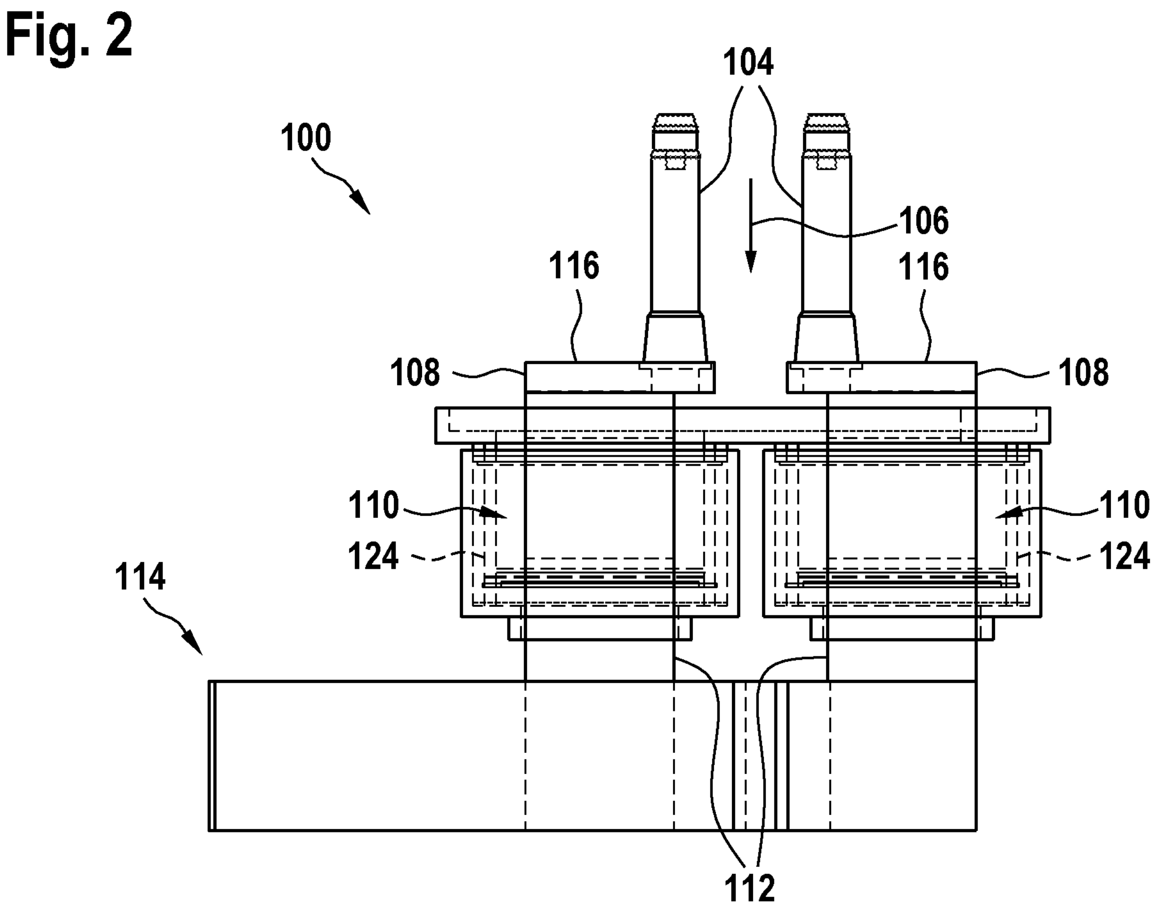
FIG. 1 depicts a sectional illustration of a charging socket according to one exemplary embodiment.
FIG. 2 depicts an illustration of a charging socket according to one exemplary embodiment.

The figures are schematic illustrations and are used only for elucidation of the invention. Elements that are the same or have the same effect are provided with the same reference signs throughout.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

FIG. 1 shows a sectional illustration of a charging socket 100 for a vehicle. The sectional illustration shows a direct current part 102 of the charging socket 100 for fast charging of the vehicle. In the region of the direct current part 102, the charging socket 100 has two parallel contact elements 104. Here, the contact elements 104 are embodied as pins, that is to say contact elements 104 with a male shape. The contact elements 104 can be plugged together with a corresponding counterpart in a plug-in direction 106 to form an electrically conducting plug-in connection. Each contact element 104 is electrically conductingly connected to an interface 110 to an electrical conductor 112 of a cable harness 114 of the vehicle via a dedicated intermediate bracket 108.

Here, the conductors 112 are flat conductors or busbars. The busbars run parallel to one another one above the other in the cable harness 114. The two busbars are electrically insulated in relation to one another and lie at different electrical high-voltage potentials during operation. The two busbars can be referred to as double busbar.

The contact elements 104 are arranged on front limbs 116 of the intermediate bracket 108. The front limbs 116 are oriented substantially perpendicularly with respect to the contact elements 104 or the plug-in direction 106. The interfaces 110 are arranged on rear limbs 118 of the intermediate brackets 108. The front limbs 116 and the rear limbs 118 are oriented at right angles with respect to one another here and are connected to one another in one piece at an edge of the intermediate bracket 108. The rear limbs 118 are thus oriented substantially parallel to the contact elements 104 or in the plug-in direction 106.

The front limbs 116 are arranged in a housing 120 of the charging socket. A plug contour 122 of the charging socket is formed on a front side of the housing 120. The contact elements 104 project into cutouts in the plug contour. The plug contour 122 defines the plug-in direction 106, forms a plug face of the charging socket 100, offers touch protection for the contact elements 104 and allows a charging plug to be plugged into the plug face in a manner protected against polarity reversal.

The rear limbs 118 project into domes 124 of the housing 120 on a rear side of the housing 120. The domes protrude beyond the rear side of the housing 120.

In one exemplary embodiment, the domes 124 are closed by closure caps 126. The closure caps 126 each have a leadthrough 128 for a conductor 112. The conductor 112 thus passes through the leadthrough 128 of the closure cap 126 and ends at the interface 110 protected inside the dome 124.

In one exemplary embodiment, the domes 124 are sealed against external influences by seals 130 in order to protect the interfaces 110. Here, a respective O-ring as seal 130 is arranged between a periphery of the closure cap 126, said periphery enclosing the dome 124, and an outer side of the dome 124. In addition, a respective areal seal 130 is arranged between a cover surface of the closure cap 126 and an edge of the dome 124. The seal 130 is pressed against the edge by the closure cap 126. The seal 130 engages around the edge and thus provides sealing on an inner side of the dome 124, at the edge and between the outer side and the closure cap 126.

In one exemplary embodiment, the seal 130 also has a leadthrough 128 for the conductor 112. The seal 130 provides sealing at the leadthrough 128 and at the conductor 112.

In one exemplary embodiment, the closure cap 126 has a collar 132 at the leadthrough 128. The collar 132 projects from the closure cap 126 in the direction of the cable harness. The collar 132 protects the leadthrough 128 of the seal 130 located behind it for example against spray water.

In one exemplary embodiment, the interfaces 110 have threaded bushings 134 via which the conductors 112 are screw-connected to the intermediate brackets 108. To reach the screws, the domes 124 have, in their side walls, service openings 136 aligned with the threaded bushings 134. The service openings 136 are closed by service covers 138.

In one exemplary embodiment, the closure caps 126 also have corresponding service openings 136 which are closed by the same service covers 138. In this case, sealing elements 140 are arranged between peripheries of the service openings 136 and the service covers 138. The sealing elements 140 seal both the service openings 136 in the domes 124 and the service openings 136 in the closure caps 126.

FIG. 2 shows an illustration of a charging socket 100 according to one exemplary embodiment. Here, the charging socket 100 corresponds substantially to the charging socket illustrated in FIG. 1. Here, it is apparent that the contact elements 104 are arranged closer together than the conductors 112 at the interfaces 110. The contact elements 104 are thus arranged eccentrically on the front limbs 116. A spacing between the contact elements 104 is dependent on a charging standard of the charging socket 100. Due to the available width of the front limbs 116, the contact elements 104 can also be arranged at a different spacing in order to thus correspond to a different charging standard. The intermediate brackets 108 and a spacing between the intermediate brackets 108 remain the same. The domes 124 are arranged next to one another on the rear side and aligned with the conductors 112 or the intermediate brackets 108. Here, the cable harness 114 extends away at a 90° offset relative to the plug-in direction 106.

Possible refinements of the invention will once again be summarized or presented with a slightly different wording below.

A connection geometry or a connection concept for a direct current (DC) interface for charging sockets is presented.

The basic function of the connection geometry is the connection of the DC charging cable harness to a charging socket. The approach presented here enables a simple, robust and cost-effective solution that is usable across manufacturers. In this case, a uniform solution can be used for all countries and the sub-variants thereof. Simple scalability can be achieved by adaptation of the size and wall thickness of the copper bracket or of the cable lug/flat conductor.

The connection can be effected upward, to the left and to the right. Many different outgoing directions are possible without any variants of the charging socket or with variants of the charging socket that are reduced to a minimum. The charging socket can be readily mounted and removed. This results in a reduction in the assembly effort. The number of necessary components is reduced to a minimum and the manufacture of the remaining components is simplified. As a result, the production costs of the charging socket and the manufacturing time, as well as the outlay in terms of warehousing, logistics and administration, are considerably reduced.

The connection of round conductors and flat conductors is possible without additional variants of the charging socket. The low construction of the geometry and the flexible design of the outgoing direction enable installation in confined installation spaces. External cooling can be effected outside of the charging socket via the cable harness.

In the approach illustrated here, the core charging socket has two domes. These are preferably of round embodiment. Openings in the domes for service covers are optional. The function of the domes in combination with the closure caps are the sealing function and the absorption of forces applied by the charging cable.

The core charging socket has latching members for the closure caps. In this case, the number is able to be adapted according to need.

The core charging socket also has two receptacles and locking members for the copper brackets. Sealing elements can be injection-molded or inserted on the core charging socket. The copper brackets each comprise an integrally welded threaded bushing. The threaded bushing can be fastened to the copper bracket for example by friction welding or a similar method.

An eccentric position of the DC pins integrally welded on the respective copper bracket enables the required spacing between the domes. It is optionally possible for other materials to be used, for example aluminum.

The closure caps can be mounted onto the cable lug or the flat conductors. The closure caps press and hold the sealing elements in position and serve to absorb forces applied by the charging cables, such as for extended guidance. The closure caps protect the sealing elements for example against water pressure of a steam ejector and other actions of force. The closure caps may be engaged with latching action with latching hooks on the core charging socket. Alternatively, the closure caps may be screw-connected to the core charging socket or fastened thereto by some other fastening possibilities.

It is optionally possible for the sealing elements to be injection-molded or inserted onto the closure caps.

A wide variety of geometric embodiments for the service covers are possible, such as a shell shape or a round or angular embodiment.

The service covers can be mounted onto the closure caps or directly onto the domes of the core charging socket.

The sealing elements are injection-molded or mounted as separate components. The sealing elements can be embodied as separate components or so as to be connected to the closure caps. The sealing elements can be connected to the closure caps for example by film hinges or strips composed of a soft component. The sealing elements allow the charging cables or the charging cable harness to be removed without removal of the charging socket. The sealing elements seal the openings for the removal in the domes.

The concept presented here enables a variable cable routing of the charging cables without variants of the charging socket, since the outgoing direction is defined via the charging cables. The flat conductors can be screwed on directly. The flat conductors can optionally be embodied with pressed-in bushings to absorb the screwing forces. The flat conductors can alternatively be screw-connected to the charging socket by means of integrally welded cable lugs.

Individual bends in the charging cables enable a multiplicity of different outgoing directions. This enables the same connection or a connection reduced to a minimum to the charging socket. The variance thus lies at the charging cables, not in the charging socket. Round, different cross sections can be welded onto a standard cable lug. Depending on the embodiment of the support, the heat can be discharged or held primarily in the charging socket, this being effected by way of the flat conductor/cable lug and/or the pressed-in bushings in a wide variety of geometric embodiments and materials.

The approach presented here enables simple mounting. The closure caps can be pushed over the cable lug/flat conductor after the welding. The "sealing elements on the inside" are pushed onto the cable lug/flat conductor if they have not already been attached directly to the closure caps or to the core charging socket. The closure caps with the sealing element are pushed onto the domes until locking is achieved. When the sealing elements are being pushed into the domes, additional pressure is produced on the sealing elements around the flat conductor, as a result of which a better sealing function is achieved. The cables are screw-connected and the service covers closed.

Direct closure by way of the closure caps is optionally possible given appropriate space conditions.

The core charging socket, the service covers and the closure caps can be produced in an injection-molding method. The sealing elements can be produced with silicone, TPE, 2K injection-molding methods and other injection-molding methods.

The sealing elements can be injection-molded but also manufactured as 1K components and mounted later on. They can also be manufactured and used as separate components.

The copper brackets can be produced by bending methods. Other production methods, such as welding, are also usable. The DC pin can be fastened to the respective copper bracket by integral welding, pressing in or some other connecting method. The screw bushing can be fastened to the copper bracket by integral welding, pressing in or some other connecting method. The copper bracket can be mounted on, overmolded on, welded to, latched to or fixed using some other fastening method to the different components of the core charging socket. This connection can be effected in a fixed or flexible manner or by the other components.

Optional cooling can be effected via the flat conductors/cable lugs. The cooling can be carried out from below, from above or from all sides. Cooling medium can circulate and thus indirectly cool the core charging socket. The cooling system can optionally be fastened to the charging socket.

Since the apparatuses and methods described in detail above are exemplary embodiments, they can be modified in a customary manner by a person skilled in the art to a wide extent without departing from the scope of the invention. In particular, the mechanical arrangements and the size ratios of the individual elements relative to one another are merely exemplary.

What is claimed is:

1. A charging socket for a vehicle, comprising:

a housing comprising two domes arranged to project from a rear side of the housing;

two contact elements of a direct current part of the charging socket;

two conductors of a cable harness;

two interfaces to the conductors;

two L-shaped intermediate brackets electrically insulated from one another, each intermediate brackets comprising a front limb and a rear limbs oriented transversely with respect to the front limb, the front limb carrying a respective one of the contact elements and the rear limb carrying a respective one of the interfaces, the intermediate brackets being arranged to electrically and conducingly connect the contact elements to the interfaces;

wherein the contact elements are arranged at a country-specific or variant-specific spacing to one another on the front limbs;

wherein the front limbs with the contact elements are arranged within the housing transversely with respect to a plug-in direction of the contact elements; and wherein each of the domes is closed by a sealed closure cap having a leadthrough configured to receive the respective conductor through a cover surface of the closure cap, and at least one contacting seal is arranged between each closure cap and the associated dome, the seal spanning at least an inner diameter of the dome and having an oversize in relation to the inner diameter, and the seal comprising a leadthrough for the conductor having an undersize in relation to the conductor.

2. The charging socket according to claim 1, wherein:

the domes comprise sealed closure caps each having a lead through configured to receive the conductor through a cover surface of the closure cap, and wherein the socket further comprises at least one respective contacting seal arranged between the closure caps and the domes.

3. The charging socket according to claim 2, wherein the closure caps further comprise at least one respective latching device configured to latch to counterparts of the housing.

4. The charging socket according to claim 3, wherein the closure caps are fastened to the housing by screw connection instead of by the latching device.

5. The charging socket according to claim 2, wherein:

each of the leadthroughs comprise a collar configured to support the conductor, and the at least one respective contacting seal is configured to transmit supported forces to the domes.

6. The charging socket according to claim 5, wherein each collar is configured such that forces supported by the conductor at the collar are transmitted via the respective seal to the associated dome.

7. The charging socket according to claim 2, wherein the closure caps are configured to be pushed onto the conductors before the conductors are connected to the intermediate brackets via the interfaces.

8. The charging socket according to claim 2, wherein the closure caps further comprise service openings arranged aligned with the threaded bushings in an end position of the closure caps, and at least the service openings in the closure caps are configured to be closed by service covers.

9. The charging socket according to claim 8, wherein each of the service covers further comprise a sealing element configured to seal the service opening.

10. The charging socket according to claim 9, wherein each service cover and the sealing element are formed as a two-component injection-molded part having a hard component for the service cover and a soft component for the sealing element.

11. The charging socket according to claim 8, wherein at least one service cover is configured to close aligned service openings in the associated dome and closure cap and to mechanically connect the closure cap to the dome so as to prevent removal of the closure cap.

12. The charging socket according to claim 2, wherein the closure caps are configured to absorb tensile and bending forces applied by the charging cables and to provide extended guidance for the conductors.

13. The charging socket according to claim 2, wherein at least one of the sealing elements arranged between the closure caps and the domes is formed as a two-component injection-molded part having a soft sealing component and a hard structural component molded onto the housing or the closure cap.

14. The charging socket according to claim 1, wherein each of the rear limbs comprises, at the respective interface, a threaded bushing for a screw connection of the conductor.

15. The charging socket according to claim 14, wherein each of the domes comprise a lateral service opening arranged aligned with the threaded bushings.

16. The charging socket according to claim 14, wherein each threaded bushing is welded, in particular by friction welding, to the respective rear limb and consists of a material that is harder than a material of the corresponding intermediate bracket.

17. The charging socket according to claim 1, wherein each seal is arranged beneath the closure cap and is pressed against an edge of the respective domes by the closure cap so as to provide sealing on an inner side of the dome and at the edge of the dome.

18. The charging socket according to claim 17, wherein the seal further comprises a leadthrough configured to provide sealing around the conductor, the leadthrough comprising an undersize in relation to the conductor.

19. The charging socket according to claim 1, wherein the conductors comprise flat conductors or busbars arranged parallel to one another in the cable harness.

20. The charging socket according to claim 1, wherein an interior of the housing is substantially identical for different world regions and only the contact elements and their spacing on the front limbs differ in accordance with a country-specific charging standard.

* * * * *